(12) United States Patent
Taylor

(10) Patent No.: US 9,376,625 B2
(45) Date of Patent: *Jun. 28, 2016

(54) HYBRID SYSTEM AND PROCESS FOR CONVERTING WHOLE TIRES AND OTHER SOLID CARBON MATERIALS INTO RECLAIMABLE AND REUSABLE COMPONENTS

(71) Applicant: Fredrick Taylor, Rome, GA (US)

(72) Inventor: Fredrick Taylor, Rome, GA (US)

( * ) Notice: Subject to any disclaimer, the term of this patent is extended or adjusted under 35 U.S.C. 154(b) by 716 days.

This patent is subject to a terminal disclaimer.

(21) Appl. No.: 13/735,113

(22) Filed: Jan. 7, 2013

(65) Prior Publication Data

US 2013/0189181 A1 Jul. 25, 2013

Related U.S. Application Data

(63) Continuation of application No. 13/178,683, filed on Jul. 8, 2011, now Pat. No. 8,350,105.

(60) Provisional application No. 61/362,517, filed on Jul. 8, 2010.

(51) Int. Cl.
| | |
|---|---|
| *C10B 1/10* | (2006.01) |
| *C10B 53/07* | (2006.01) |
| *B01J 19/00* | (2006.01) |

(Continued)

(52) U.S. Cl.
CPC .................. *C10B 53/07* (2013.01); *B01J 19/00* (2013.01); *C09C 1/48* (2013.01); *C10B 47/30* (2013.01); *C10G 1/10* (2013.01); *C22B 7/001* (2013.01); *C10G 2300/1003* (2013.01); *Y02P 10/214* (2015.11); *Y02P 20/143* (2015.11)

(58) Field of Classification Search
CPC ........ C10B 47/04; C10B 47/00; C10B 47/06; C10B 47/34; C10B 53/07; C10B 1/10; C10B 7/02
USPC ............. 585/241; 201/25; 202/131, 136, 216, 202/218, 222
See application file for complete search history.

(56) References Cited

U.S. PATENT DOCUMENTS

| | | |
|---|---|---|
| 3,787,292 A | 1/1974 | Keappler |
| 4,125,437 A | 11/1978 | Bacon |

(Continued)

OTHER PUBLICATIONS

International Search Report and Written Opinion in International Application No. PCT/US11/43359 mailed Dec. 1, 2011, 10 pages.

(Continued)

*Primary Examiner* — Nina Bhat
(74) *Attorney, Agent, or Firm* — Thomas | Horstemeyer, LLP

(57) ABSTRACT

A system and method of converting tires or other solid carbon based material is disclosed, including providing a chamber, feeding the solid carbon based material into the chamber, rotating the chamber, heating and reducing the material in the chamber, collecting solid residue from the chamber, collecting vapor from the chamber, and converting vapor collected from the chamber to a liquid. In an embodiment, the material includes a whole tire. The tire is heated in the chamber causing the tire to collapse and liquefy, exposing the metal in the tire which aids in grinding the carbon material in the tire as it tumbles, collecting solid residue, for example tire carbons, and collecting vapor, for example vaporized oil, and benzene and methane gas from the chamber and converting the oil. The chamber may be heated to a temperature from about 500° F. to about 1000° F. using gases reclaimed from the material.

19 Claims, 4 Drawing Sheets

(51) Int. Cl.
*C09C 1/48* (2006.01)
*C10B 47/30* (2006.01)
*C10G 1/10* (2006.01)
*C22B 7/00* (2006.01)

(56) References Cited

U.S. PATENT DOCUMENTS

| | | | |
|---|---|---|---|
| 4,133,718 A | | 1/1979 | Jaquay |
| 4,235,676 A | * | 11/1980 | Chambers .................. C07C 1/00 201/15 |
| 4,563,246 A | | 1/1986 | Reed et al. |
| 4,983,278 A | | 1/1991 | Cha et al. |
| 5,057,189 A | | 10/1991 | Appfel |
| 5,078,836 A | | 1/1992 | Hogan |
| 5,095,040 A | | 3/1992 | Ledford |
| 5,258,101 A | | 11/1993 | Breu |
| 5,366,595 A | | 11/1994 | Padgett et al. |
| 5,628,261 A | | 5/1997 | Beckstead et al. |
| 5,728,361 A | | 3/1998 | Holley |
| 5,820,736 A | * | 10/1998 | Bouziane .................. C10B 1/10 202/136 |
| 5,821,396 A | | 10/1998 | Bouziane |
| 5,851,361 A | * | 12/1998 | Hogan ...................... C10B 1/10 201/12 |
| 5,894,012 A | | 4/1999 | Denison |
| 5,989,019 A | | 11/1999 | Nishimura et al. |
| 6,011,187 A | | 1/2000 | Horizoe et al. |
| 6,133,491 A | | 10/2000 | Xing |
| 6,172,275 B1 | * | 1/2001 | Tadauchi ................. C10G 1/00 423/481 |
| 7,329,329 B2 | | 2/2008 | Masemore et al. |
| 7,931,783 B2 | | 4/2011 | Dam-Johansen et al. |
| 8,038,745 B2 | | 10/2011 | Pearson |
| 8,350,105 B2 | | 1/2013 | Taylor |
| 2002/0035804 A1 | | 3/2002 | Garcia-Secovia et al. |
| 2004/0025763 A1 | | 2/2004 | Kaneko |
| 2004/0261672 A1 | | 12/2004 | Nusimovich |
| 2006/0163053 A1 | | 7/2006 | Ershag |
| 2007/0000768 A1 | | 1/2007 | Cauley |
| 2008/0257709 A1 | * | 10/2008 | Dimitrov ................ C10B 47/04 201/25 |
| 2008/0286557 A1 | | 11/2008 | Tucker |
| 2009/0211892 A1 | * | 8/2009 | Cunningham .......... B29B 17/02 201/25 |
| 2012/0010450 A1 | | 1/2012 | Taylor |

OTHER PUBLICATIONS

Supplemental European Search Report of Application No. EP 13736250.5 dated Jul. 17, 2015, 8 pages.
International Search Report and Written Opinion in International Application No. PCT/US13/20997 mailed Mar. 12, 2013, 11 pages.

* cited by examiner (A)

(B)

(c)

HYBRID SYSTEM AND PROCESS FOR CONVERTING WHOLE TIRES AND OTHER SOLID CARBON MATERIALS INTO RECLAIMABLE AND REUSABLE COMPONENTS

CROSS-REFERENCE TO RELATED APPLICATION

This application is a continuation of Ser. No. 13/178,683, filed Jul. 8, 2011, which claims the benefit of U.S. Provisional Patent Application No. 61/362,517 entitled "PYROLYSIS CHAMBER AND METHOD OF PYROLYZING MATERIAL" filed on Jul. 8, 2010, incorporated herein by reference in its entirety.

FIELD OF THE DISCLOSURE

The present disclosure relates to a unique hybrid system and process for converting whole tires and other solid carbon based materials into reclaimable and reusable components, such as one or more of syngas, oil, carbon black and steel without combustion of the carbon based materials.

BACKGROUND OF THE DISCLOSURE

Various methods are used to dispose of tires. For example, they can be simply ground up or mulched, or used for fuel referred to as tire derived fuel (TDF). Tires have been used as fuel in the cement industry in cement kilns, in boilers in pulp and paper mills, in power plants of electric utilities and in industrial boilers. When used for fuel the tires are typically first ground up or shredded and then placed in an incinerator at high temperatures, for example, above 1500° F., and incinerated as, for example, in US application publication no. US 2004/0025763.

There are a number of problems, however, with incinerating tires or using tires as fuel. One is the metal in the tires. The metal in the tires tends to clog feed systems in the pulp and paper industry. As a result, the pulp and paper industry needs to remove the metal, or de-wire the tires, before using them as fuel. Similarly, the tires must be de-wired and typically ground up before use by electric utilities. Also, when grinding the tires, tiny fines of metal from the steel bead ring in the tires and the steel belts in radial tires are left in the ground up material.

Other problems with incinerating tires for fuel involve environmental issues with air emissions that can include dioxins, furans, carbon monoxide, sulfur dioxide, hydrogen sulfide, nitrous oxides (NOx), carbon dioxide, and/or particulates. There can also be problems with disposal of resulting ash that can include metals and heavy metals from the tires, such as zinc, chromium, cadmium and lead. Moreover, these methods of disposal also do not reclaim for reuse any of the various components of the tires.

There is a need, therefore, for an improved system for not only disposal of used tires, but also for recovery of the tire components for reuse. Additionally, there is a need for more energy efficient disposal of tires and recovery of tire components for reuse.

SUMMARY OF THE DISCLOSURE

The carbon hybrid system and method of the present disclosure overcomes the aforementioned disadvantages and results in creating up to 8 times or more useable energy than it consumes to convert the tire or other solid carbon based materials into useable products or fuels. The present carbon hybrid system and method are unique in the design of the machinery and in the process. In an exemplary embodiment the present system includes a chamber designed to receive and process tires, in particular whole tires, or other solid carbon based material in the existing form. The tires from lawn and garden size of 15 inches in diameter to large mining tires about nine feet in diameter can be processed as manufactured in the chamber saving all the energy needed to shred or cut the tires into smaller parts.

In an embodiment the carbon hybrid system and process includes a chamber and is designed to move the tires or other solid carbon based materials ("product") from a loading door at one end of the chamber, through which product is loaded into the chamber, by an internal rib system to move the product to the opposite end of the chamber. As the product is heated the chamber is rotated so that the heat is indirectly applied to the product allowing the product to liquefy and vaporize. In an embodiment, the rotation and indirect heating of the product causes a tumbling and roasting of the product in the chamber.

Where the product is a tire, the tire collapses in the chamber. The steel wire that is in the tire is exposed. The steel wire starts to beak down the tire and grind the carbon back into a powder. As the tire is heated in the chamber the tire rubber begins to liquefy and low temperature gases, such as methane, benzene and other low flash point gase's, are emitted from the tire. These gases are captured in the process, for example by a vacuum system, and re-pressurized. Some or all of the re-pressurized gases, now for example natural gas or propane, can be used to heat the chamber.

In an embodiment by capturing the low temperature gases, called syngas, up to 85 percent of the energy required to convert the tires to the separate components of oil, carbon black and steel is generated by the tire or other solid carbon material in the carbon hybrid system. The system can be controlled by a computer software program designed to achieve this result in the conversion process.

In an embodiment of the present disclosure the system and process is designed to heat tires or other solid carbon based material to a designed temperature, for example about 500° F. to about 1000° F. This results in the following benefits for the products produced from the reaction of the present system. One, the collected low temperature gases, called syngas, can generate up to about 85 percent of the energy needed to convert the tire or other solid carbon based material. Two, the oil that results is useable grade to make into gasoline, diesel, and other usable oil base products. Three, steel of a useful size can be recovered to be re-melted into new products. Four, the carbon black created by the process is reusable to make new tires based on, for example, a mixture of about 20 to 30 percent recovered carbon black to about 70 to 80 percent virgin carbon black. This is the first known result of converting tire carbon black to a re-useable carbon black material useful for the manufacture of new tires.

In another embodiment, the present system and process for converting tires or other solid carbon based material to the useable products of one or more of syngas oil, carbon black and steel generates only trace amounts of $CO_2$. The $CO_2$ generated in converting a passenger tire can be as low as $\frac{1}{20}$th of a pound of $CO_2$. No other green house gases are generated in the process. Furthermore, the steel bead wire of the tire and the radial carcass wire are as manufactured by the tire company. The wire is clean and ready to be processed into new steel. This can save up to 70 percent of the energy needed in making steel from pig iron and other products.

In an embodiment, the chamber of the present system has tapered, or conically shaped, side walls and has a rib system, such as spiral ribs on the inside of the side walls that help move the tires or other solid carbon based material to an end of the chamber to be collected. As the chamber is rotated the steel in the tires acts as a grinding material to break up the carbon black in the product into the useable sizes. The rotation of the tires while the tires are heated in an indirect method allows for the tires to be fluffed and allows the heat to penetrate the product surface indirectly. This is the only known design or system that uses this method allowing the vapors of syngas and oil to escape quickly without too much direct heat resulting in deteration of the materials. The structure of carbon black can be changed by direct heat that is too high. The present system further pulls the carbon black up the side wall to ensure that the material does not receive direct heat that will result in deterioration of the material.

In one embodiment, present system includes a chamber having a substantially circular wall which may or may not be tapered and opposed end panels, one end panel providing a feed inlet and an opposed end panel providing an outlet, the interior of the circular wall having an arrangement of inwardly projecting ribs, heating means for heating the interior of the chamber, and means for rotating the chamber, the chamber being designed to process product, such as whole tires or other solid carbon based material, converting the product into vapor, oil and solid residue, for example, syngas, high grade oil, an carbon black and metal.

In another embodiment, a system is provided including the aforementioned chamber, a solid residue collection chamber connected to the outlet of the chamber, a vapor collection chamber also connected to the outlet of the chamber, and one or more condensers coupled to the vapor collection chamber for receiving vapor from the vapor collection chamber and for converting the vapor to a liquid, for example, oil. In a further embodiment, the system may also include one or more scrubbers coupled to an outlet from the one or more condensers, a compressor for re-pressurizing the remaining vapor and converting the remaining vapor to a liquid, such as liquid natural gas or propane, and a holding tank for the liquid resulting from the compressor.

In one embodiment, the present method of converting solid carbon based material comprises the steps of providing a rotatable chamber in which the material can be heated introducing the material into the chamber, rotating the chamber and heating the material in the chamber to reduce the material, collecting low temperature gases or oil or both from the chamber; and collecting residual solids form the material. The chamber has an interior surface and the interior surface is provided with a rib system including one or more ribs to rotate the material in the chamber and cause a tumbling of the material in the chamber.

In a further embodiment of the present method, the material includes a solid whole tire. The chamber can be heated, for example to a temperature between about 500° F. and about 1000° F. The collected low temperature gases include one or more of methane and benzene. The collected residual solids include carbon solids and metal from the tire. The heating and rotating of the tire in the chamber causes the tire to collapse and liquefy giving off the low temperature gases. As the tire liquefies the steel in the tire becomes exposed and aids in breading down the tire and grinding carbon from the tire into a powder as the tire is tumbled inside the chamber. At least a portion of the low temperature gases can be collected and used to heat the chamber. The low temperature gases provide up to 85% of the energy needed to heat the chamber and convert the tire.

In a further embodiment, a method of converting tires or other solid carbon based material is disclosed, wherein the method includes providing a chamber such as the aforementioned chamber, feeding tires or other solid carbon based material or both into the chamber, heating and reducing the material in the chamber, collecting solid residue from the chamber, collecting vapor from the chamber, and converting vapor collected from the chamber to a liquid. In another embodiment, wherein the material includes tires, the method includes collecting solid residue, for example, tire carbons, such as carbon black, and collecting vapor, for example, vaporized oil, and benzene and methane gas from the chamber and converting the oil to, for example, No. 2 to No. 6 fuel oil. In yet another embodiment, the method includes heating the chamber to a temperature from about 500° F. to about 1000° F.

Other systems, devices, features, and advantages of the disclosed system will be or become apparent to one of skill in the art upon examination of the following drawings and detailed description. It is intended that all such additional systems, devices, features, and advantages be included within this description, be within the scope of the present invention, and be provided by the accompanying claims.

BRIEF DESCRIPTION OF THE DRAWINGS

Many aspects of the system and method of converting material, in particular tires and other solid carbon based material, of the present disclosure can be better understood with reference to the attached drawings, FIGS. 1-3. The components of the drawings are not necessarily to scale, emphasis instead being placed on clearly illustrating the principles of the present system and method. Moreover, in the drawings, like reference numerals do not need corresponding parts throughout the several views.

DESCRIPTION OF THE EXEMPLARY EMBODIMENTS

Figure 1:
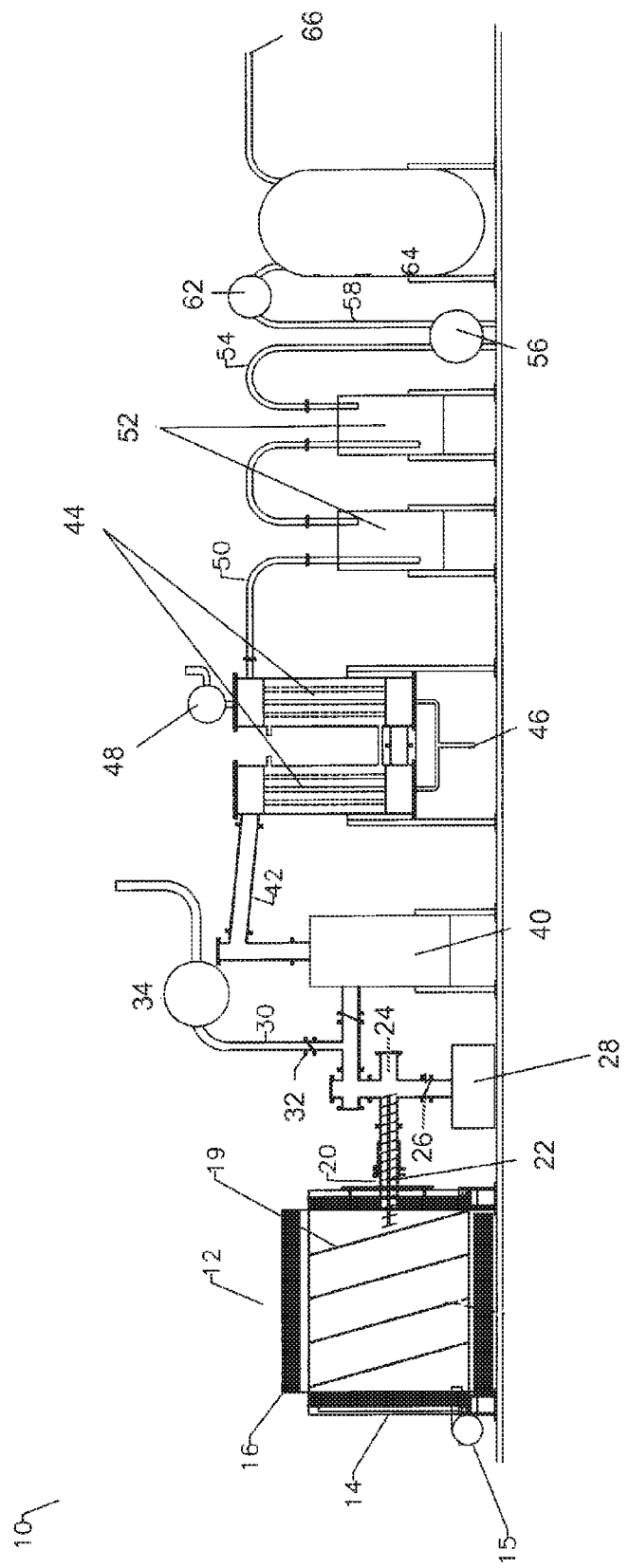
FIG. 1 illustrates a system layout for carrying out one method of the present disclosure, including an exemplary chamber.
Figure 2:
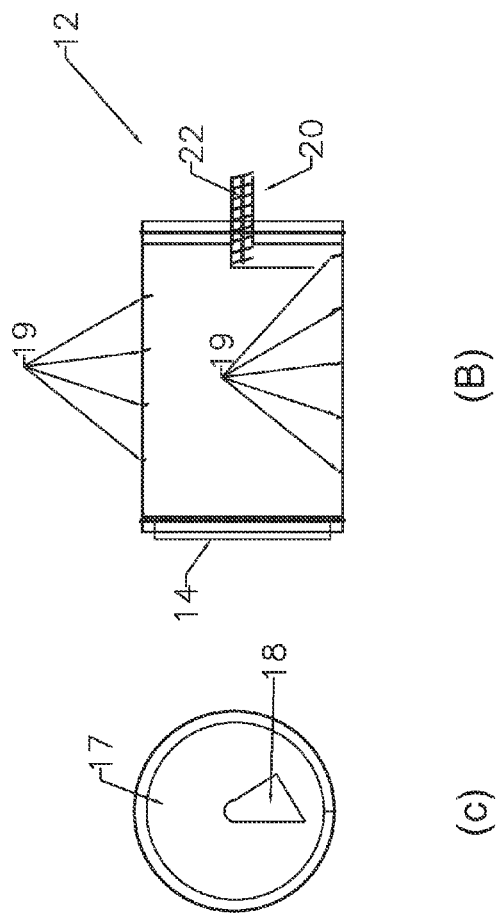
FIGS. 2A-C illustrate one embodiment of a chamber of the present disclosure.
Figure 2:
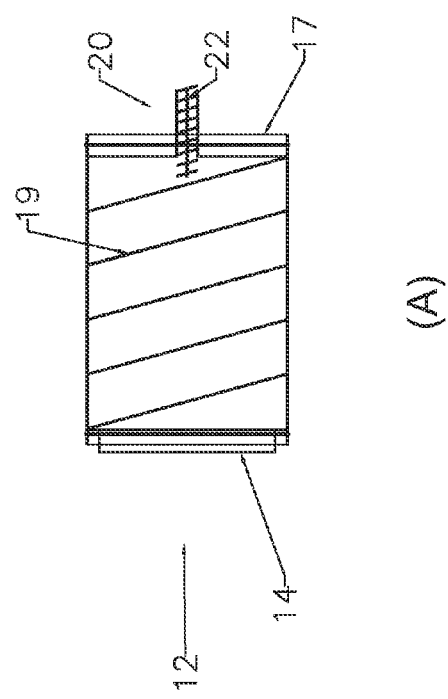
Figure 3:
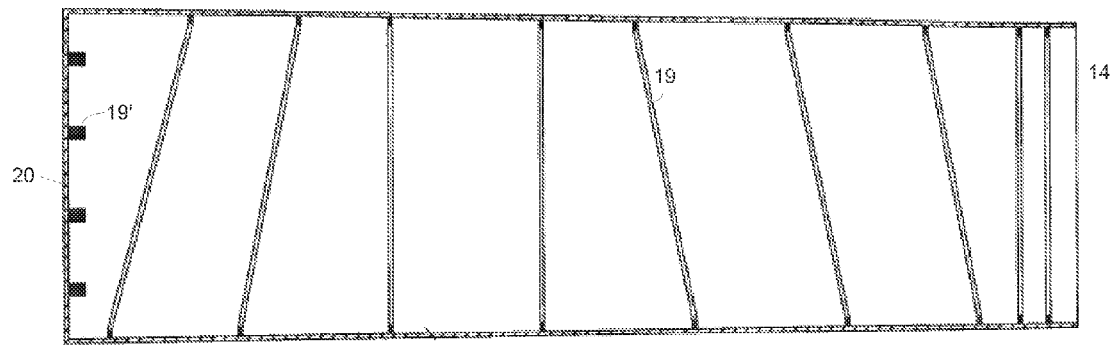
FIGS. 3A-C illustrate another exemplary embodiment of a chamber of the present disclosure.
Figure 3:
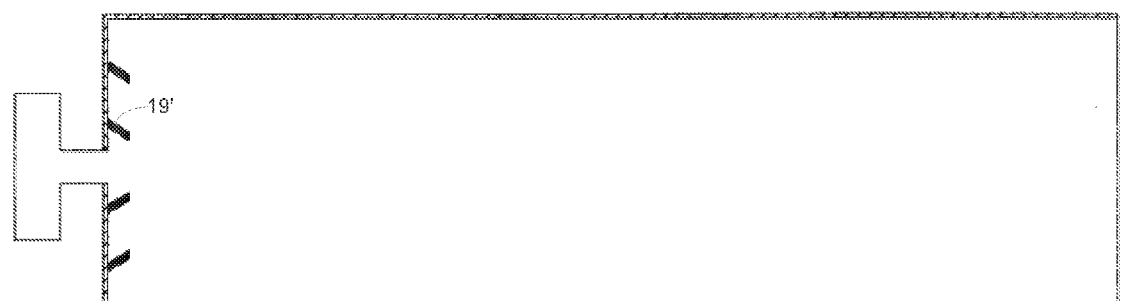

Referring more specifically to the drawings in which like reference numerals refer to like elements throughout the several views, exemplary non-limiting embodiments of the system and method of converting material, in particular tires and other solid carbon based material, of the present disclosure is illustrated in FIGS. 1-3. Referring to FIG. 1, one embodiment of a system for carrying out the method of the present disclosure is illustrated.

FIG. 1 illustrates an exemplary embodiment of a system and method of converting material, in particular, tires and other solid carbon based material. The system 10 includes a gasifier chamber 12, typically insulated, for converting material, in particular, tires and other solid carbon based material. In one embodiment the gasifier chamber 12 is a rotary chamber having opposed end panels, one end panel having a feed inlet 14, such as a door, allowing for the introduction of the material into the chamber 12. The chamber 12 includes one or more heaters 15, for example low-nox gas heaters for heating and converting the material. An opposed end panel 17 includes a chamber outlet 20 for removing material from the chamber 12 resulting from the heating and rotation of the chamber. In one embodiment the outlet 20 includes an auger system 22 for removing solid materials from the chamber 12. The gasifier chamber 12 may have a vane and collection chute 18 associated with the chamber outlet 20 for removing solids from the chamber in cooperation with the auger 22.

In one embodiment, the gasifier chamber 12 is a cylindrical rotating chamber having a substantially circular wall 16 in cross-section. A motor and associated coupling means (not shown) are provided to rotate the chamber. The wall 16 can be tapered having a larger diameter at one end panel than at an opposed end panel. For example, the chamber 12 can have a larger diameter at the end of the chamber having feed door 14 than at its opposite end having chamber outlet 20.

In another embodiment, the circular wall 16 includes a plurality of ribs or vanes 19 mounted or attached to the interior surface of the circular wall 16 and projecting inwardly from the wall's interior surface. In one embodiment, the ribs 19 may project inwardly anywhere from about ⅛ of an inch to about 3 inches in height. In one embodiment, the ribs 19 can be positioned in a helical manner, as illustrated, for example, in FIG. 2A. Further, the ribs 19 may have a constant height throughout the chamber, or alternatively may have varying heights within the chamber. For example, as illustrated in FIG. 2B, the height of the ribs 19 may increase from the feed end, having feed door 14, towards the outlet end panel 17. In yet another embodiment, the ribs 19 may not be parallel to each other. Instead, as illustrated for example in FIG. 3A, the ribs closest to the feed end 14 of the chamber 12 may initially be parallel to each other and then change in angle such that they are angled toward the interior of the chamber away from the feed end. Similarly, the ribs at the chamber outlet 20 end may be angled in a manner such that they also converge towards the middle of the chamber.

Figure 3C:
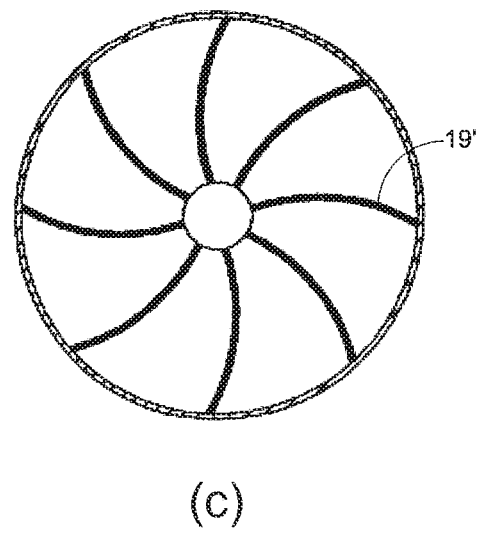

The chamber 20 may optionally further include ribs 19' mounted to the inside surface of the outlet end panel 17 of the chamber 12, as illustrated, for example, in FIGS. 3B and 3C. In one embodiment, the ribs 19' mounted to the interior surface of the outlet end panel 17 may project inwardly from the interior surface of the outlet panel either perpendicular to the interior surface of the panel, as illustrated, for example, in FIG. 3A, or at an angle to the interior surface of the outlet panel 17, as illustrated, for example, in FIG. 3B. In one embodiment, the ribs 19' may be angled in a manner such that they converge towards each other and towards the chamber outlet 20 and unloading auger 22. In yet another embodiment, the ribs 19' may have a nautilus-type configuration, as illustrated, for example, in FIG. 3C.

Connected to the chamber outlet 20 is a conduit 24 which at one end directs solid materials resulting from the heating and grinding of the materials within the chamber 12 towards a collection chamber 28. An unloading valve 26 may be included in the conduit 24 to assist in periodically discharging solids, such as carbon black, from the collection chamber 28. In another direction conduit 24 directs off gases from the chamber 12 towards a vapor collection chamber 40. Before the conduit 24 reaches vapor chamber 40, an exhaust conduit 30 having exhaust valve 32 may be included along with exhaust fan 34.

High temperature gases from the conversion of the material in chamber 12 are temporarily collected in vapor chamber 40 where they may begin to cool. Vapor chamber 40 has an outlet having including outlet conduit 42 that leads to one or more condensing chambers 44, which have an outlet 46 leading to one or more collection tanks and, for example, an overpressure safety valve 48. In one embodiment, the one or more condensers 44 may be water cooled to further cool the gases exiting the chamber 12.

The one or more condensers 44 have an outlet including an outlet conduit 50 that leads to one or more gas scrubbers 52. An outlet conduit 54 is provided for the one or more scrubbers 52 that lead to a compressor 56, to condenser outlet conduit 58 and ultimately to a holding tank 64. Included in the compressor outlet conduit 58 can be a gas vapor meter 62. An outlet conduit 66 can be provided for the holding tank 64.

In an exemplary embodiment, the method of converting material of the present disclosure involves converting tires and recovering, for example, syngas, carbon black, metal or steel, and oils from the tires. Whole tires may be introduced into the chamber 12 through feed door 14. The tires need not be ground up or pulverized before being placed in the chamber 12. Further, there is no need to de-wire the tires before placing them in chamber 12. For example, whole tires ranging from 4 inches in diameter to 120 inches in diameter can be placed into the chamber and processed by the present system and method.

The chamber is heated and rotated. This causes the tires or other solid carbon based material, or both, to be rotated by the chamber by the internal ribs 19, 19' of the chamber 12. In the case of tires, the ribs 19 lift the tires and allow them to fall over as they are lifted up the side wall of the chamber allowing for the heat from the surface of the chamber 12 to be delivered over and over similar to a clothes dryer. This allows for continuous heat transfer to the tires and control of the surface temperature of the tires. In an embodiment of the process, rotating the tires up the side wall of the chamber 12 allows the tires to be evenly roasted, in particular the surface of the tires. Further, by controlling the temperature in the chamber 12 from about 500 to about 1000 degrees F. the carbon black in the tires is released without total deteration. The carbon black reclaimed from tires maintains its tensile strength, yield and necessary properties to be re-used in the manufacture of tires, making this process unique.

The inside surface of the chamber 12 with ribs 19 that lift and rotate the tires with a taper have at least two unique advantages. In addition to lifting and rotating the tires and controlling the temperature of the tires, the steel wire in the tires to acts as a grinding or impacting tool to reduce the size of the tires, in particular their carbon products, to a fine grain powder. As the tires loose their shape and come apart the ribs and/or tapered wall of the chamber 12 move the material to one end of the chamber. Further, the now released bead wire of the tires and the ribs of the chamber reduce the size of the carbon black and clean the steel wire of all remaining hydrocarbon materials from the steel.

In one embodiment, the circular wall 16 of chamber 12, as mentioned above, is tapered such that its diameter narrows in the direction of the chamber outlet 20. Such a taper can assist in pushing the tires from the feed end 14 of the chamber 12 towards the outlet 20, as the chamber is rotated and as the tires are processed, to enhance the grinding of the tire carbon material into a fine powder.

In another embodiment, the ribs in the chamber 12 can also be tapered to push the material in the chamber towards the outlet 20 and for better grinding. In another embodiment, the present method can involve changing the direction of rotation of the chamber to the opposite direction to assist in grinding the tire material such that, for example, chamber 12 is rotated first in one direction and subsequently in the opposite direction to process the tires.

In one embodiment, the conversion process carried out in chamber 12 is a batch process in which one or more tires are placed in the chamber and processed. Tire carbon, for example carbon black, in the form of a fine powder is removed by the unloading auger 22 at the chamber outlet 20 into conduit 24, ultimately falling into collection chamber 28. At the end of the process only the steel beads, and in the case of radial tires, the cord wire, are left in the vessel or chamber 12. This metal can be subsequently removed and sold as scrap metal.

In the case of processing tires, the vapor exiting chamber 12 can include vapor in the form of vaporized oil and benzene and syngas, which vapor is delivered by conduit 24 to vapor chamber 40 where the vapor is temporarily held and begins to cool. The vapor exits vapor chamber 40 by way of conduit 42 and is delivered to the one or more condensing chambers 44. In one embodiment, the condensing chambers can be water cooled to assist in the condensation of the vapor into a liquid, in particular oil. The oil that collects at the base of the one or more condensing chambers 44 can be removed by way of the condensing chamber outlet 46 and delivered to one or more collection tanks (not shown).

Remaining vapor is delivered from the one or more condensing chambers 44 by way of conduit 50 to one or more gas scrubbers where impurities can be removed. The cleaned vapor can then be delivered by way of conduit 54 to the compressor 56. In one embodiment, compressor 56 can re-pressurize the remaining vapor up to about 40 psi, allowing conventional burners to use the vapor or gas for heating the chamber 12. The syngas in holding tank 64 can be sold. Some of the oil from holding tank 64, however, may be returned back to the one or more heaters 15 to assist in heating chamber 12. The use of syngas from holding tank 64 for heaters 15 can reduce the need for an outside fuel source for heating chamber 12 by as much as 85%.

The system and process of the present disclosure can, therefore, not only recover the tire black, for example in the form of carbon black, from tires, but also recover the steel in the tires for salvage as well as recovering the organics in the tires in the form of, for example, No. 2 to No. 6 fuel oil that can be used refining into petroleum products.

The present disclosure is not limited to processing tires. For example, any solid carbon based material such as shoes, plastic, rubber belting, and rubber construction tracks of any size can be processed by the present system and method.

It should also be emphasized that the above-described embodiments of the present disclosure are merely possible examples of implementations set forth for a clear understanding of the principles of the present disclosure. Many variations and modifications may be made to the above-described embodiments without departing substantially from the spirit and principles of the disclosure. All such modifications and variations are intended to be included herein within the scope of this disclosure and protected by the following claims.

The invention claimed is:

1. A method of converting a tire comprising the steps of:
   providing a rotatable chamber in which a whole tire can be heated;
   introducing a whole tire into the chamber;
   rotating the chamber causing a tumbling of the tire in the chamber;
   indirectly heating the tire in the chamber while rotating the chamber to reduce the tire, wherein the chamber is heated to a temperature between about 500° F. and about 1000° F.;
   collecting low temperature gases or oil or both from the reduced tire from the chamber; and
   collecting residual solids from the tire from the chamber.

2. The method of claim 1, wherein the collected low temperature gases include one or more of methane and benzene.

3. The method of claim 1, wherein the collected residual solids include carbon solids.

4. The method of claim 1, wherein the collected low temperature gases include one or more of methane and benzene and the collected residual solids include carbon solids and metal from the tire.

5. The method of claim 1, wherein the heating and rotating of the tire in the chamber causes the tire to collapse and liquefy giving off the low temperature gases.

6. The method of claim 5, wherein, as the tire liquefies, the steel in the tire becomes exposed and aids in breaking down the tire and grinding carbon from the tire into a powder as the tire is tumbled inside the chamber.

7. The method of claim 5, wherein at least a portion of the low temperature gases are collected and used to heat the chamber.

8. The method of claim 7, wherein the low temperature gases provide up to 85% of the energy needed to heat the chamber and reduce the tire.

9. The method of claim 3, wherein the carbon solids include carbon black that retains its tensile strength sufficient for reuse of the recovered carbon black in the manufacture of a new tire.

10. The method of claim 1, wherein the whole tire is introduced into the chamber without pre-treatment of the tire.

11. The method of claim 1, wherein the collected low temperature gases include syngas.

12. The method of claim 7, wherein the collected low temperature gases include syngas and at least a portion of the collected syngas is used to heat the chamber.

13. The method of claim 3, further including the step of reusing the carbon solids in the manufacture of a new tire.

14. A method of converting solid carbon based material comprising the steps of:
   providing a rotatable chamber in which the material can be heated, the chamber having an interior surface;
   introducing the material into the chamber, wherein the material includes a whole tire;
   rotating the chamber causing a tumbling of the tire in the chamber and heating the material in the chamber to a temperature between about 500° F. and about 1000° F., wherein the heating and rotating of the tire in the chamber causes the tire to collapse and liquefy giving off the low temperature gases to reduce the material;
   collecting low temperature gases or oil or both from the chamber; and
   recovering carbon solids from the material from the chamber.

15. The method of claim 14, wherein the low temperature gases include syngas and at least a portion of the syngas is returned to heat the chamber.

16. The method of claim 14, wherein the recovered carbon solids include carbon black that retains its tensile strength sufficient for reuse of the recovered carbon black in the manufacture of a new tire.

17. The method of claim 14, wherein the chamber is indirectly heated.

18. The method of claim 17, wherein heat from the surface of the chamber heats and reduces the tire.

19. The method of claim 14, further including the step of mixing about 20 percent to about 30 percent of the carbon solids with about 70 percent to about 80 percent virgin carbon black to form a carbon black mixture for use in producing tires.

* * * * *